(12) United States Patent
Randhava et al.

(10) Patent No.: US 10,240,098 B2
(45) Date of Patent: Mar. 26, 2019

(54) MODULAR PROCESSES FOR THE PRODUCTION OF TIGHT GAS AND TIGHT OIL AND FOR TIGHT OIL REFINING

(71) Applicant: Acid Technologies LLC, Stafford, TX (US)

(72) Inventors: Sarabjit S. Randhava, Evanston, IL (US); Richard L. Kao, Northbrook, IL (US); Edward H. Stribling, III, Houston, TX (US); Kenneth J. Schmitt, Spring, TX (US)

(73) Assignee: ACID TECHNOLOGIES, LLC, Stafford, TX (US)

( * ) Notice: Subject to any disclaimer, the term of this patent is extended or adjusted under 35 U.S.C. 154(b) by 80 days.

(21) Appl. No.: 15/241,330

(22) Filed: Aug. 19, 2016

(65) Prior Publication Data
US 2017/0051214 A1     Feb. 23, 2017

Related U.S. Application Data

(60) Provisional application No. 62/208,389, filed on Aug. 21, 2015.

(51) Int. Cl.
*C10G 67/14*     (2006.01)
*C01B 3/48*     (2006.01)
*E21B 43/26*     (2006.01)

(52) U.S. Cl.
CPC ............... *C10G 67/14* (2013.01); *C01B 3/48* (2013.01); *C01B 2203/0244* (2013.01); *C01B 2203/0283* (2013.01); *C01B 2203/0495* (2013.01); *C01B 2203/06* (2013.01); *C01B 2203/0883* (2013.01); *C01B 2203/1241* (2013.01);

(Continued)

(58) Field of Classification Search
CPC .............. C10G 67/14; C10G 2300/202; C10G 2300/205; C01B 3/48; C01B 2203/0244; C01B 2203/06; C01B 2203/0495; C01B 2203/1258; C01B 2203/1241; C01B 2203/0883; C01B 2203/0283; E21B 43/26
See application file for complete search history.

(56) References Cited

U.S. PATENT DOCUMENTS

2014/0034549 A1*   2/2014   Mukherjee ............. C10G 65/14
                                                      208/58

* cited by examiner

*Primary Examiner* — Randy Boyer
*Assistant Examiner* — Juan C Valencia
(74) *Attorney, Agent, or Firm* — Richard A. Fagin

(57) ABSTRACT

Modular, portable processes and apparatus for the production of tight gas (including shale gas) and tight oil (including shale oil) and for the conversion of tight oil into a plurality of marketable fuels are described which enable easy deployment and start-up and are specifically useful in remote areas. Furthermore, these modular processes and apparatus are configured to use co-produced tight gas as a source of processing energy. Another feature of the modular processes is to substantially reduce the use of fracking water and process water. In some embodiments modular processes include (A) Purified Salt Production; (B) Modular Hydrochloric Acid (HCl) Production; (C) Hydrogen Production by Autothermal Reformer; (D) Optimized Hydraulic Fracturing; (E) Desalting with Bi-Electric Configuration with an Interchanger; (F) Desalter Water Recovery and Recyclling; (G) Precut Column with a Gas-Fired Heater; (H) Crude Distillation with a Gas-Fired Heater; (I) Hydrodesulfurization using Reactive Distillation; and (J) Vacuum Distillation.

20 Claims, 9 Drawing Sheets

(52) U.S. Cl.
CPC .......... *C01B 2203/1258* (2013.01); *C10G 2300/202* (2013.01); *C10G 2300/205* (2013.01); *E21B 43/26* (2013.01)

MODULAR PROCESSES FOR THE
PRODUCTION OF TIGHT GAS AND TIGHT
OIL AND FOR TIGHT OIL REFINING

CROSS REFERENCE TO RELATED
APPLICATIONS

Priority is claimed from U.S. Provisional Application No. 62/208,389 filed on Aug. 21, 2015 and incorporated herein by reference in its entirety.

STATEMENT REGARDING FEDERALLY
SPONSORED RESEARCH OR DEVELOPMENT

Not Applicable

NAMES OF THE PARTIES TO A JOINT
RESEARCH AGREEMENT

Not Applicable.

BACKGROUND

This disclosure relates to processes and apparatus for the production of tight gas and tight oil, and for processed and apparatus used in tight oil refining. These processes are used to release tight gas and tight oil trapped in low permeability rock formations such as shale, sandstone, or carbonate rock formations by techniqued called—extended-reach horizontal drilling and optimized modern hydraulic fracturing. Some of the tight gas produced may be used for making process hydrogen. Tight oil may be locally (e.g., at the location of a producing subsurface well) converted into value added products that are typically used for bitumen diluents, ultra low sulfur diesel (ULSD) and products for jet fuel and production of power.

Technological advancements in extended-reach horizontal drilling and optimized modern hydraulic fracturing are helping to unlock large quantities of tight oil and tight gas trapped in low permeability subsurface rock formations such as shale, sandstone, or carbonate rock formations in, e.g., the United States, Canada and China on a commercial scale. The U.S. Energy Information Administration estimates that about 4.2 million barrels per day of crude oil (or 49% of total U.S. crude oil production) will be produced directly from tight oil resources in the United States in 2015. Hydraulic fracturing has also substantially changed the economic outlook for the U.S. natural gas industry, as shown in the latest Energy Information Agency 2014 annual report:

The report forecasts a 56% increase in total natural gas production between 2012 and 2040;
The above increase is largely due to growth in shale gas and tight gas production;
Shale gas output if forecast to double from 9.7 trillion standard cubic feet (Tcf) in 2012 to 19.8 Tcf in 2040;
The shale gas share of total U.S. natural gas output is forecast to increase from 40% in 2012 to 53% in 2040;
Tight gas production if forecast to increase by 73%, but its share of total gas production is forecast to remain relatively constant.

Improved hydraulic fracturing processes used to extract tight gas and oil require large volumes of fracking fluid (consisting of, e.g., water, sand/ceramic beads or other proppant, hydrochloric acid (HCl) and small amounts of other chemicals). After a subsurface reservoir formation is fractured, the proppant (e.g., sand/ceramic beads) is left in the fluid pressure induced fractures to keep the fractures open after removing the pressure on the fracturing fluid, which allows the oil and gas to flow to the well through the high permeability paths created by the propped fractures. Hydrochloric acid (HCl) has become an important part of the hydraulic fracturing process. HCl serves to clear cement debris in the wellbore and thereby provides an open conduit for subsequent hydraulic fracturing operations by dissolving carbonate minerals and opening fractures near the wellbore.

There is a strong demand for HCl for the hydraulic fracturing of oil production fields. These fields are usually located in relatively inaccessible areas where truck transportation of liquids is difficult.

It is opportune to produce HCl proximate to oil producing fields and thereby minimize truck transportation requirements. It is therefore desirable to establish local modular HCl production units.

The production of tight gas and tight oil also requires significant amounts of fuels, and among the family of fuels, ultra low sulfur diesel fuel (ULSD) is of economic significance due to the fact that it has to be used for multiple applications among which are, without limitation, fuel for generating power for pumps used in fracking operations, pumpout operations, transportation of equipment and transportation of produced tight oil. Another family of fuels, primarily naphthas and lighter hydrocarbon components, can be refined from tight oil. The naphtha cut can be readily used as bitumen solvent and can also reformed to produce high octane motor gasolines. Another family of fuels, primary in the kerosene cut, can be maximized to satisfy a higher demand for jet fuel by manipulating the kerosene flow rate. Another family of fuels, equivalent to #6 fuel oil, can be produced from tight oils. This family of fuels can be used for local power production applications.

Construction and operation in tight gas and tight oil producing fields are subject to special requirements. The processing plants must be configured for decentralized operation with a high level of operating efficiency to minimize the use of power and human labor resources. Since tight gas is typically widely available, energy usage optimization is of lesser importance in tight gas production. Modules may be used for such processes. The modules used, however, should be configured for operation in adverse weather conditions. Typically due to the geographic location of many tight gas and tight oil fields, the modules have to be sized so that portions of the set of modules used in any particular process or set of processes can be readily shipped by truck.

DETAILED DESCRIPTION

Figure 1:
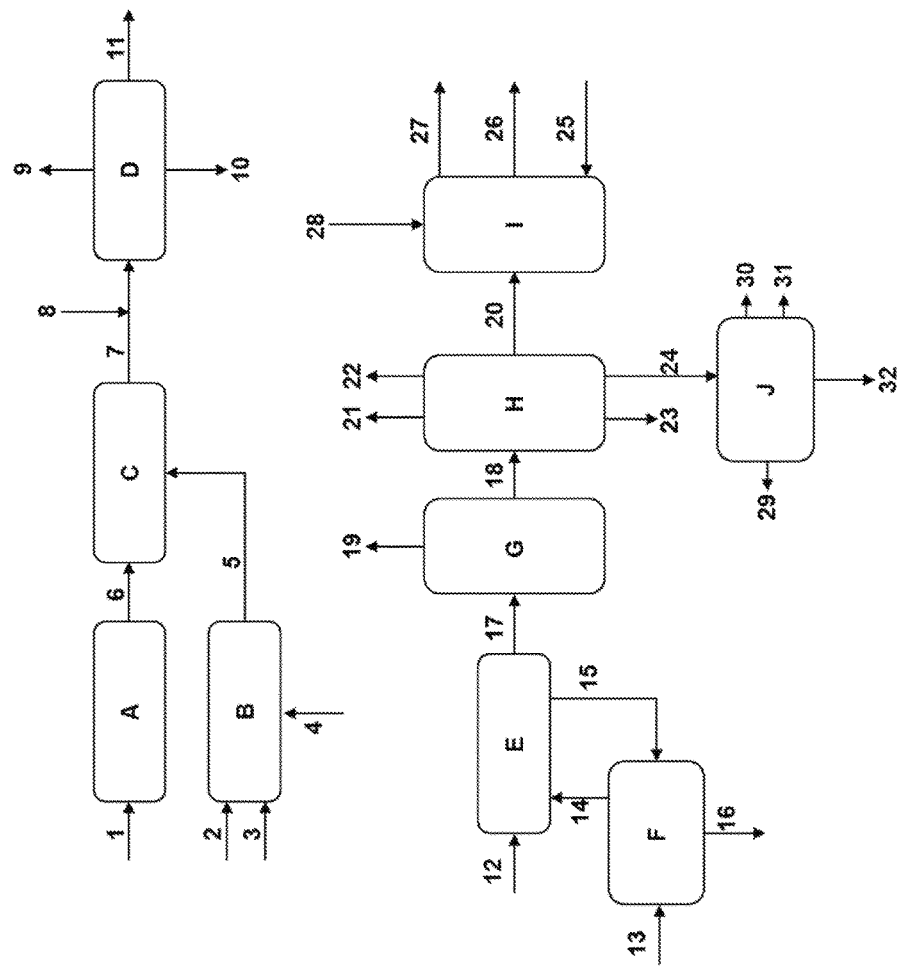
FIG. 1 shows a simplified block diagram of the modular processes for the production of tight gas and tight oil and tight oil refining, inclusive of major components of the individual modules and the numbered streams connecting the components and modules.

FIG. 1 shows a simplified block diagram of modular processes for the production of tight gas and tight oil, and tight oil refining, including major components of individual modules and the numbered streams connecting the components and modules. Listed below is a summary of the function of each module and numbered streams.

Figure 2:
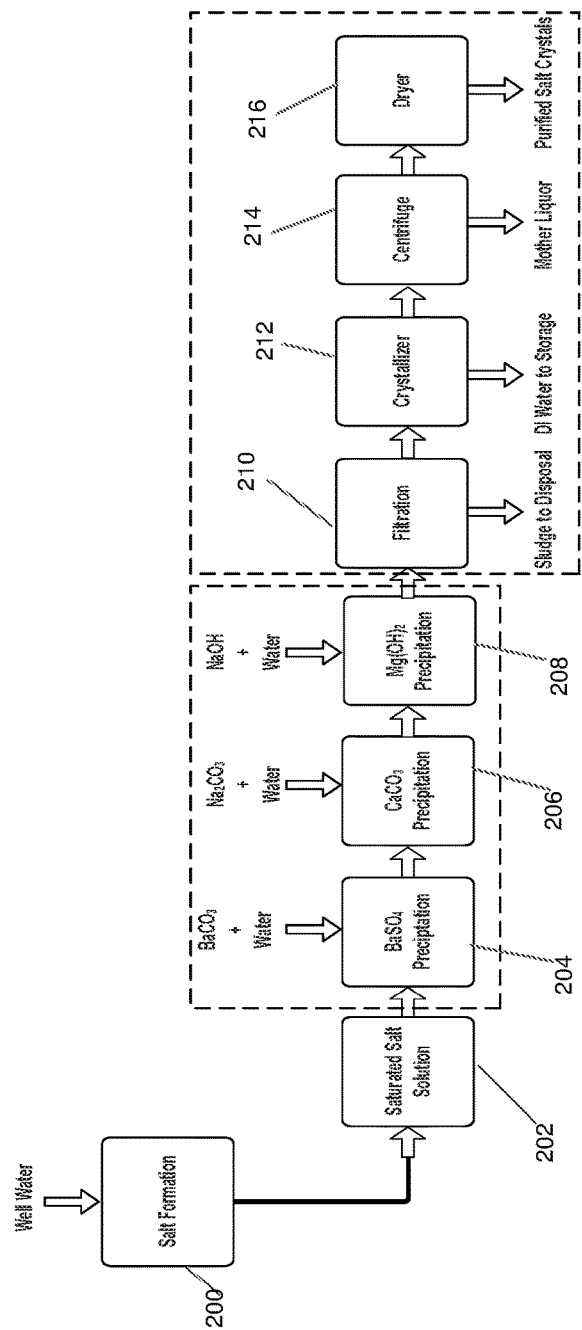
FIG. 2 is the brine system block schematic.

Module A: Purified Salt Production
Module B: Regional Modular HCl Production Facility
Module C: Hydrogen Production Using Autothermal Reformer
Module D: Optimized Modern Hydraulic Fracturing
Module E: Desalter with Bi-Electric Configuration with Interchanger
Module F: Desalter Water Recovery and Recycle
Module G: Precut Column with Gas Fired Heater
Module H: Crude Distillation Unit with Gas Fired Heater
Module I: Hydrodesulfurization Unit using a Reactive Distillation Column
Module J: Vacuum Distillation Column
Stream 1: Saturated Brine Solution
Stream 2: Tight Gas to Autothermal Reformer
Stream 3: 93 vol % Oxygen to Autothermal Reformer
Stream 4: Low Pressure Steam to Autothermal Reformer
Stream 5: Hydrogen Steam to HCl Production
Stream 6: Purified Salt to HCl Production
Stream 7: HCl Stream
Stream 8: Fracking Fluid to Optimized Modern Hydraulic Fracturing
Stream 9: Tight Gas Stream to Gas Purification
Stream 10: Fracture-Flowback-Water and Produced-Water Stream
Stream 11: Tight Oil Stream to Tank Farm
Stream 12: Tight Oil Feed Stream from Tank Farm
Stream 13: Make-up Water Stream
Stream 14: Consolidated Heated Water Stream to Desalter
Stream 15: Desalter Water Effluent to Purification Section
Stream 16: Purge Stream from Purification Section
Stream 17: Desalted and Dewatered Tight Oil Stream
Stream 18: Effluent from Precut Column
Stream 19: Naphtha Stream from Precut Column
Stream 20: Diesel Cut to Hydrodesulfurization Unit
Stream 21: Naphtha from Crude Distillation Unit
Stream 22: Kerosene from Crude Distillation Unit
Stream 23: Fuel Oil from Crude Distillation Unit
Stream 24: Residue from Crude Distillation Unit
Stream 25: Hydrogen Stream to Hydrodesulfurization Unit
Stream 26: ULSD Product
Stream 27: Recycle Gas to PSA
Stream 28: Recycle Hydrogen to Hydrodesulfurization Reactor
Stream 29: Off Gas from Vacuum Distillation Column
Stream 30: Light Vacuum Fuel Oil from Vacuum Distillation Column
Stream 31: Heavy Vacuum Fuel Oil from Vacuum Distillation Column
Stream 32: Asphaltic Residue from Vacuum D Module A: Purified Salt Production Facility The acid production facility (Hydrochlor-Alkali Process) may include two production facilities. The first one is for the production of purified salt, while the other one is a regional modular hydrochloric acid (HCl) production plant. A brief description of the Purified Salt Production process will be explained with reference to FIG. 2.

Brines may be either naturally occurring or are produced from underground salt deposits 200 by deep well solution mining. A saturated brine solution at 202 may be subjected to a series of sequential chemical treatments. Saturated brine may be first subjected to mixing with a barium carbonate suspension at 204 where a bulk of sulfate contaminants are converted into barium sulfate precipitate. The resulting slurry may then be mixed with a sodium carbonate solution at 206 resulting in the precipitation of calcium carbonate. Finally the slurry may be blended with a sodium hydroxide (NaOH) solution at 208 resulting in the formation of magnesium hydroxide precipitates.

The composite slurry may be directed into precipitate backwash filters at 210 that work in a parallel configuration where one of the filters is on line while other one(s) may be off line for clean up. The purified brine will typically have a cation level below 3 parts per million (ppm).

The purified brine solution may be directed into a double effect crystallizer at 212 that uses forced circulation to crystallize the salt. This solution may be hydrocloned and then centrifuged at 214 to separate the salt crystals. These wet crystals may then be dried in a hot air rotary dryer at 216 and directed to a site warehouse for eventual disposition to a chloralkali facility.

Experimentation in developing processes and apparatus according to the present disclosure has identified that a purified salt production facility that is designed for producing 131 STPD is an optimal size that is capable of servicing three satellite small chloralkali plants. Each satellite chloralkali plant can produce about 68 STPD of 35.7 weight percent (wtt % or 22° Baumé) HCl as well as 53 STPD of 50 wt % sodium hydroxide (NaOH).

Module B: Regional Modular HCl Production Facility

This facility is designed to use purified salt as a starting material to produce 68 STPD of 35.7 weight % (22° Baumé) HCl. This facility converts purified salt into ultrapure brines, pumping these brines into an electrolysis unit to produce hydrogen ($H_2$), chlorine ($Cl_2$) and a 32 weight % stream of NaOH. The $H_2$ and the $Cl_2$ are reacted to produce HCl gas that is absorbed into DI water to make a product of the right composition. The NaOH stream is evaporated to produce 50 weight % NaOH.

The Regional Modular HCl Production Facility in the present example embodiment has six sections and its process flow diagram will be explained with reference to FIG. 3.

The Brine Ultra Purification Section: Section 1

Figure 3:
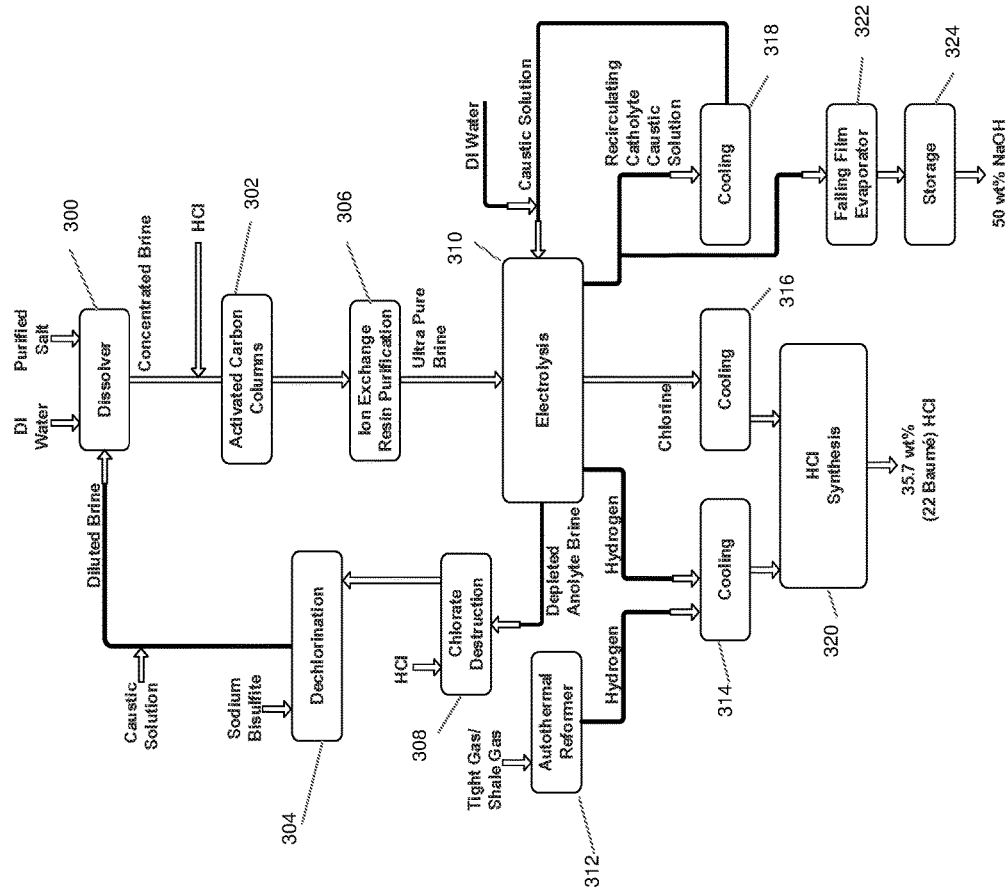
FIG. 3 is the flow diagram of the regional HCl production facility.

In this section and with reference to FIG. 3, purified salt, DI water and a diluted brine stream may be merged together in a dissolver tank 300 to create a concentrated brine solution. This solution may then be subjected to ultra-purification steps. In the first step, the solution flows through activated carbon beds at 302. One bed is operational while the other bed is either regenerated with dilute hydrogen peroxide ($H_2O_2$) or the activated bed carbon is discharged and replaced with fresh material. The primary function of this step is to ensure that there is no residual chlorine left in the stream. The brine solution then flows through ion exchange columns at 306 where the calcium/magnesium ion levels are reduced from 3 ppm to <20 parts per billion (ppb). There are two ion exchange columns in the present example embodiment, with one on-line while the other column is being regenerated using a very careful sequence protocol of NaOH wash followed by HCl wash followed by DI water wash. The ultrapure brine stream is then sent to an electrolyzer at 310.

The Depleted Anolyte Brine Purification Section: Section 2.

The depleted anolyte brine purification is still a part of the overall brine circuit. In this section, hot, depleted anolyte brine solution circulates out of the electrolyzer 310 for remediation. The pH is adjusted to 2-2.5 using HCl at 308. This enables the chlorine to be less dissolved in the brine. The stream is sent into a chlorine stripping column at 304 that operates under vacuum and results in a significant majority of chlorine being removed and directed to the HCl synthesis section. Further chlorine and chlorate removal may be conducted by injecting a solution of sodium bisulfate (NaHSO$_4$) also at 304 that will convert the chlorine into sodium chloride with sodium sulfate being a collateral product. Finally any remaining chlorine is neutralized with a small injection of 32 weight % NaOH.

A small stream of brine may be purged out of the brine circuit at this juncture. The balance of the anolyte stream may be sent to the dissolver at 300.

The Electrolyzer Section: Section 3.

The ultrapure brine stream is pumped into the membrane electrolyzer at 310 for conversion into hydrogen, chlorine and 32% NaOH solution. The ultrapure brine circulates through the anolyte chamber of the electrolyzer—part of the sodium chloride gets converted electrolytically and the balance of the stream, commonly referred to as depleted anolyte brine, is circulated back for subsequent purification. The chlorine gas that leaves the anolyte chamber passes through a demister at 316 to remove the carried water. The chlorine leaving the demister is sent to the HCl synthesis section at 320.

The ions that pass through the membrane flow into the catholyte chamber. Hydrogen is produced in the catholyte chamber which is then sent into its own demister at 318, and the demisted hydrogen is sent to the HCl synthesis section. The catholyte chamber has a circulating NaOH solution stream. 32 weight % NaOH is produced in this chamber and flows into a surge tank from where a part of it is sent to the evaporator section. The balance of the caustic solution is diluted with DI water, cooled and recycled back into the catholyte chamber.

The Falling Film Evaporator Caustic Soda Concentration Section: Section 4.

The 32 wt % NaOH solution extracted from the catholyte circulating stream may be sent to a falling film evaporator section at 322 for concentrating into a 50 weight % NaOH product. This section comprises a series of heat exchangers and interchangers leading to a falling film evaporator that operates under vacuum. Evaporated water is recycled back into the process and the 50 wt % NaOH is sent to a tank at 324.

The Hydrogen Production (Autothermal Reformer) Section: Section 5.

The HCl synthesis unit requires 10-15% excess hydrogen. Current industrial practice is to consume the extra chlorine by reacting it with 25 wt % NaOH solution to make sodium hypochlorite bleach. However, in order to limit truck transportation requirements, the additional hydrgoen is produced by taking a small quantity of tight gas and reforming it. Autothermal reforming (ATR) is conducted using tight gas, steam and 93 volume % oxygen as the reactants. Steam is produced from DI water by using the excess heat. Oxygen is produced by compressing air and using Vacuum Pressure Swing Adsorption (VPSA) generation. The syngas produced by the autothermal reformer is sent to a water gas shift reactor that converts CO efficiently into additional hydrogen. The hydrogen is sent to the HCl synthesis unit. The entire process may be thermally balanced to ensure optimal efficiency.

The HCl Production Section: Section 6.

The entire process is optimized to produce 35.7 weight % (22° Baumé) HCl. Hydrogen and chlorine gases, with 10-15% excess hydrogen are directed into a graphite lined combustion chamber where they react in an exothermic reaction to produce HCl. The combustion chamber may be cooled with a water circuit since it is important to remove the heat of the combustion reaction. The hydrogen chloride gas is produced at a temperature of 3,632-4,532° F. (2,000-2,500° C.). This gas flows out of the combustion chamber into an integrated isothermal falling film absorber where the HCl is absorbed by downward flowing water/weak acid. The falling film absorber operates in a countercurrent fashion. The HCl is withdrawn from the bottom section of the falling film absorber, directed into a transfer tank and then pumped out to the storage tanks. A tail gas scrubber may be provided to ensure that unreacted gases are free of chlorine and HCl vapor.

Module C: Hydrogen Production Reformer

The HCl synthesis needs about 10-15% excess hydrogen. The electrolyzer, however, produces equimolar quantities of hydrogen and chlorine.

A separate unit may be provided that will be capable of producing the additional hydrogen needed for the HCl synthesis.

Th present embodiment has been configured to produce 68 STPD of 35.7 weight % HCl. This capacity requires the following gas flow rates.

Cl$_2$: 11,439 standard cubic feet per hour (SCFH) from the electrolyzer

H$_2$: 11,439 SCFH from the electrolyzer

H$_2$: 1,720 SCFH from the Autothermal Reformer

Total H$_2$ Required in the HCl synthesis: 13,159 SCFH

As may be determined from the above, a separate hydrogen production section may be incorporated that is capable of producing about 1,750 SCFH of hydrogen. Autothermal reforming (ATR) is one example of a way to produce this hydrogen.

Figure 4:
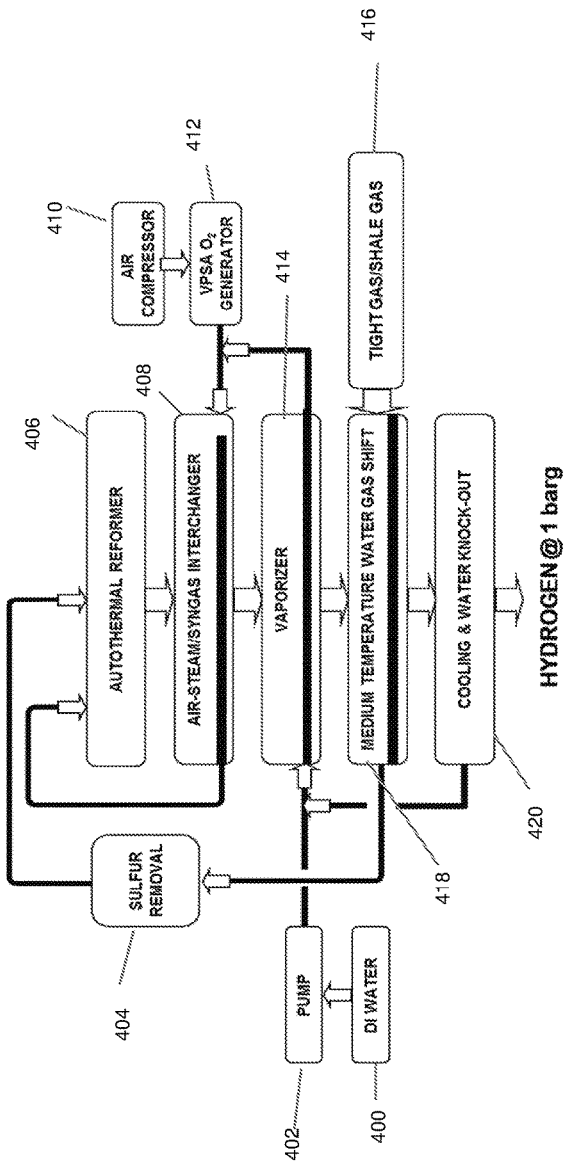
FIG. 4 is the hydrogen production process using autothermal reformer.

A hydrogen production process using an autothermal reformer will be explained with reference to FIG. 4.

The hydrogen production system is based upon autothermal reformation (ATR) and medium temperature water gas shift (MTWGS). The system may be fully integrated with optimized thermal management.

Configurationally, there are three streams that may be introduced into the autothermal reformer. The three streams are tight gas, oxygen and steam. Due to the fact that the produced hydrogen is at modest pressures, the entire hydrogen production system may be a low pressure unit.

Tight gas at 416 may be preheated by directing it through tubes in the water gas shift reactor at 418. The exothermic heat of reaction is picked up by the tight gas which raises its temperature up to about 600° F. (316° C.). This gas is then passed over a zinc oxide bed at 404 where any sulfur species present are adsorbed and removed. The sulfur free hot tight gas is injected into the autothermal reformer at 406.

Ambient air is compressed at 410 up to about 120 psig (8.3 barg) and sent into a VPSA oxygen generator at 412. The VSPA oxygen generator may be a dual bed unit with one bed operational while the other bed is in a regeneration mode. Oxygen is the non-adsorbed species and passes through the VPSA generator at a pressure of around 45 psig (3.1 barg). The adsorbed species comprising primarily of nitrogen with a small amount of oxygen are exhausted out of the bed under vacuum. Typically the oxygen concentration available is about 93 volume % with the balance being nitrogen.

DI water at 400 is pumped at 402 into a post autothermal reactor heat recovery unit at 414 where it is vaporized. This vaporizer may be similar to a shell and tube heat exchanger where the hot gases pass through the tubes and the DI water passes into the outer jacket where the boiling occurs. The steam leaving this unit is merged with the oxygen and the combined stream passes into an interchanger at 408 that preheats the steam-oxygen stream prior to its introduction into the autothermal reformer at 406.

The autothermal reformer may use a noble metal ATR catalyst impregnated on a monolith. This unique catalyst promotes oxidation and reforming simultaneously and enables a lower temperature operation with very high space velocities. The ATR catalyst operates at approximately 1500° F. (816° C.) and the MTWGS catalyst operates at about 650° F. (343° C.) at the outlet.

The hot gases leaving the autothermal reformer transfer heat to the incoming reactants in a two step mode. The first step is the steam oxygen interchanger at 408 and the second step is the steam production boiler. These two steps are designed to bring the hot gas temperature down to about 650° F. (343° C.).

These hot gases still contain a significant amount of CO in the stream. This CO can be readily converted into additional hydrogen by directing these gases across a reactor bed that contains a water gas shift catalyst, e.g., at 416. The reaction as shown below reacts the CO and steam in the hot gases to produce additional hydrogen and $CO_2$.

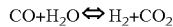

$$CO + H_2O \Leftrightarrow H_2 + CO_2$$

The gases leaving the water gas shift reactor are air cooled at 420 and directed into a knock-out pot to drop a significant quantity of water out of the stream. This water is recycled back to the reformer.

The cooled gas primarily comprises hydrogen which may then be sent to the HCl synthesis section.

Module D: Optimized Modern Hydraulic Fracturing

Hydraulic fracturing, or "fracking," includes the injection of substantial amounts of water, proppant, (e.g., sand/ceramic beads), HCl and other chemicals at high pressure (i.e., above the fracture pressure of the subsurface formations) down and across into wells drilled to selected depths below the surface. The pressurized fluid causes the rock formation to crack. After the formation is fractured, the proppant is left in the cracks to keep the cracks open after the pressure on the fluid is relieved. The propped cracks (fissures) provide a high permeability path from the formation to the well which allows oil and gas in the formation to flow more readily to the well. HCl is an important part of the hydraulic fracturing materials used as it serves to clear cement debris in the wellbore and helps to provide an open conduit for subsequent hydraulic fracturing operations by dissolving carbonate minerals and opening fractures near the well.

A one-time injection of the above described hydraulic fracturing fluid mixture is called a "frac job". Some wells may require 40 or more frac jobs, depending on the length of the well and the distances between naturally occurring hydrocarbon deposits in the formation. Other wells in oil and gas producing fields may be used to inject water into subsurface reservoirs to improve hydrocarbon productivity. What is extracted from fluid producing wells in such reservoirs, along with natural water from the formations, is "produced" water that must be managed. Over the life of many such wells, about eight barrels of produced water are brought to the surface for every barrel of oil. On the other hand, "frac flowback" water may be 15-30% of the volume of injected frac job water that flows back to surface in the few weeks following a frac job when a well is placed into fluid production. This frac job flowback fluid may be more contaminated than produced water because of the chemicals added to the frac job water before it is injected into the formations. For economic and environmental reasons, recycling of produced water and frac flowback water is expected to increase substantially in the future (*Breakthrough water clean-up technology*, Origin Clear, V201Q2, Apr. 15, 2015).

Optimized modern hydraulic fracturing is a safe and effective way to maximize the efficiency of the oil and gas production process while minimizing the number of wells and their associated surface impact required to recover hydrocarbons from subsurface reservoirs.

Module E: Desalter with Bi-Electric Configuration with Interchanger

Tight oil contains contaminants such as water, dissolved salts that can poison catalysts and other particulate materials such as clay, silt, rust and well construction debris. These contaminants can cause corrosion and fouling problems in equipment located downstream of producing wells. These contaminants may be removed using electrostatic desalting, which is an operation that separates oil and water according to Stoke's Law.

In one embodiment of electrostatic desalting, the tight oil is first preheated to 100-150° F. in heat exchangers in order to decrease the viscosity, which should normally be 2.39 kinematic centistokes at 100° F. The temperature is limited by the vapor pressure of the tight oil. The tight oil may be mixed with about 2-5% preheated fresh water, which is dispersed into the tight oil as small emulsified droplets. An important feature for optimizing desalter operation is the addition of an appropriate mix of chemical formulations. These formulations include pH depressants, metals complexing agents, sedimentation accelerators and corrosion inhibitors. Depressing pH down to levels ranging from 5-6 improve the oil-water separation and also affect the sedimentation properties. In certain cases, other functionalities may also be added ranging from surfactants, biocides, scale control and emulsion breakers.

The water-in-oil dispersion is then pumped into the pressurized desalter vessel where a high voltage electrical field accelerates separation of the water laden with salt and other contaminants combined in the oil. Distributors feed the tight oil and emulsified water in two parallel horizontal radial streams between the three electrodes. The oil emulsion streams flowing outward from the distributor encounter optimal conditions for rapid coalescence. As coalescence proceeds, water droplets grow large enough to overcome the viscosity of the tight oil and fall due to gravity. They descend in a rain-like pattern out of the flowing oil into the non-turbulent pool of water below. Electrodes are engineered to maximize the performance of the dual horizontal distribution system. Clean oil, free of contaminants, continuously rises to the top of the vessel and flows out.

In one embodiment, the accumulated water and sediment mixture is automatically withdrawn from the bottom of the vessel for processing. The dissolved salts in the water are mainly chlorides and carbonates which are recognized as major corrosion and fouling agents. In addition, solids present in the tight oil will accumulate in the bottom and must be periodically washed out. In one embodiment, this mud washing system comprises of recycling a portion of the desalter effluent water to agitate the accumulated solids so that they are ported out with effluent water. This system is then routed for further processing.

Module F: Desalter Water Recovery and Recycle

Fresh water is ordinarily a scarce commodity in tight gas and tight oil fields.

Water usage has to be very carefully optimized and managed.

Desalter effluent is a major source of contaminated wastewater and a source of oil under carry. Removal of this oil under carry and dissolved salts, clays, silt, rust and other debris makes desirable a systematic method to accomplish this task.

Figure 5:
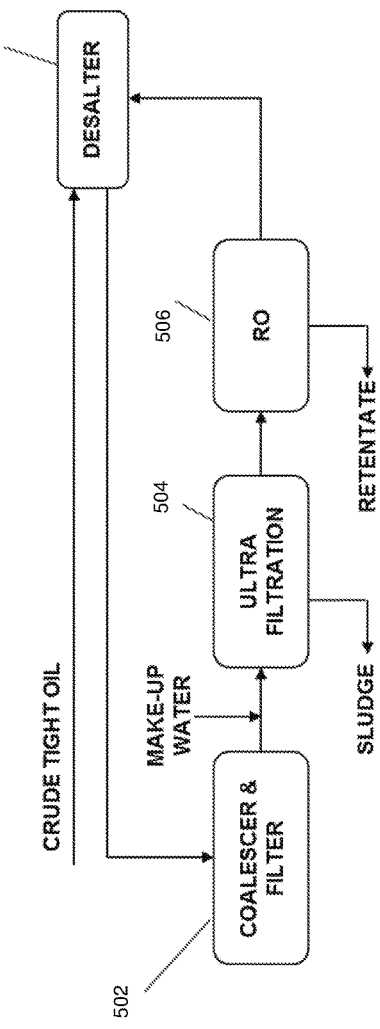
FIG. 5 is the desalter water recovery and recycle.

One example embodiment of water use and optimization will be explained with reference to FIG. 5. A general rule for a stable desalter operation is to input about 5% water stream as a fraction of the "tight" oil entering the desalter. Under normal conditions, the tight oil itself will contain brines ranging from 0.1% to 0.5%. The water and brine composite stream is separated in the desalter at 500 and is directed into a coalescer and filter unit at 502 where residual fine solids are separated while the oil emulsion is coalesced and the oil layer periodically discharged. In some embodiments, the coalesce and filter unit can remove solids down to below 2 microns and down to <5 ppm oil at the outlet. In one example embodiment, make-up water may be introduced after the coalescer and filter 502. The deoiled and filtered stream along with the make-up water is then pumped through an ultra-filter station at 504 to ensure that all the fine submicron sized particles are purged out. In some embodiments, this ultra-filter station can reduce turbidity levels to substantially below 0.1 NTU and substantially less than 1 ppm oil. This operation will typically have over 70% water recovery. The clean filtered stream along with make-up water is pumped through a reverse osmosis unit at 506 to eliminate mono- and divalent cations. In some embodiments, the total dissolved solids can be reduced to levels below 500 ppm. The deionized water is the permeate in this operation and about 30% of the stream is purged out as a retentate In one embodiment, the ultra filtration unit 504 and reverse osmosis unit 506 membranes may utilize tangential or crossflow filtration to reduce solids loading of the membrane. In this configuration, the liquid is pumped at high velocity over the membrane surface creating shear forces and enhancing the permeating fluxes. In another embodiment, the membranes may be made of a multiplicity of sheets which are arrayed as parallel discs separated by gaskets. These membranes are encased in a package that is vibrated at extremely high frequency producing shear waves that propagate sinusoidally from the membrane surface. Shear energy increases by a 5 to 10 times factor producing higher rates of filtration and also pushing away particles from the membrane surfaces.

The purge streams emanating from the coalescer/filter operation at 502, the ultra-filtration operation at 504 and the reverse osmosis operation at 506 may be consolidated and shipped, e.g., by truck to the appropriate local saltwater disposal wells.

Module G: Precut Column with Gas Fired Heater

In one example embodiment, a gas-fired heater of a precut column is a forced draft unit including a heat exchanger, burner equipment, fire tube, blower, gas train, stack, piping connections including process headers, and steel supports. The heater may be completely factory assembled with minimum on-site bolt-up assembly required. Field welding is generally not necessary.

The fuel burner is the heat source and generates a high velocity, high momentum discharge of hot combustion gases. Combustion air is forced tangentially from a combustion air blower into the inner cone with rotational flow that generates vortexes at the primary and secondary combustion zones creating very short flames which minimize radiant heat.

High temperature inert gas from the burner enters the heat exchanger at high velocity. The hot jet-stream of combustion products passes through the center core, away from the coil. As the gases travel through the center of the cabin, cooler exhaust gases are entrained and mixed into the hot jet stream. This mixing provides a uniform bulk temperature of flue gases over the coil. The uniform temperature passing over the coil at high velocity is the key to a uniform flux rate throughout the entire heater. The mixed flue gas rapidly reverses flow direction 180 degrees and turns back down and across the process helical coil. The rapid counter flow of high velocity hot combustion gases circulates around each process tube in the exchanger process tube of the exchanger. This creates an extremely uniform convective heat transfer flux rate around the surface of each process tube. Complete combustion within the fuel burner means no flames within the tube area and keeps the tube walls safe from the flames. Coking of process tubes is also minimized. The gas fired heater operates at a pressure of 50 psia and a temperature of 450° F.

Figure 6:
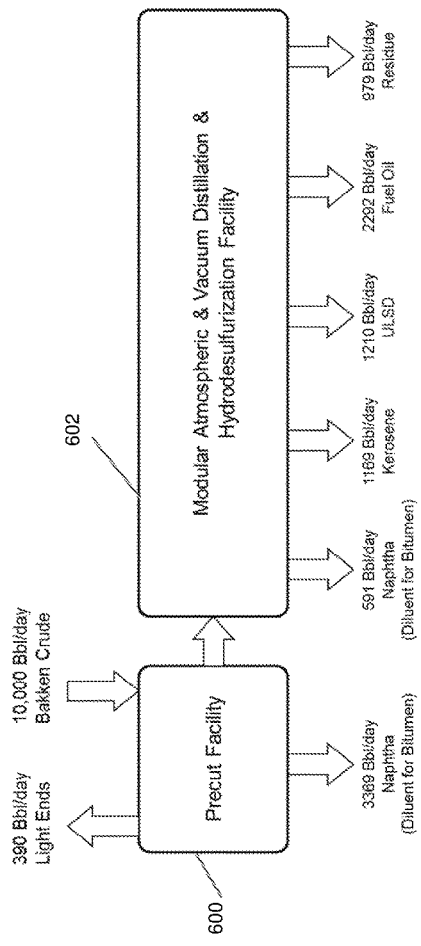
FIG. 6 is the modular processes designed for Bakken Crude refining.
Figure 7:
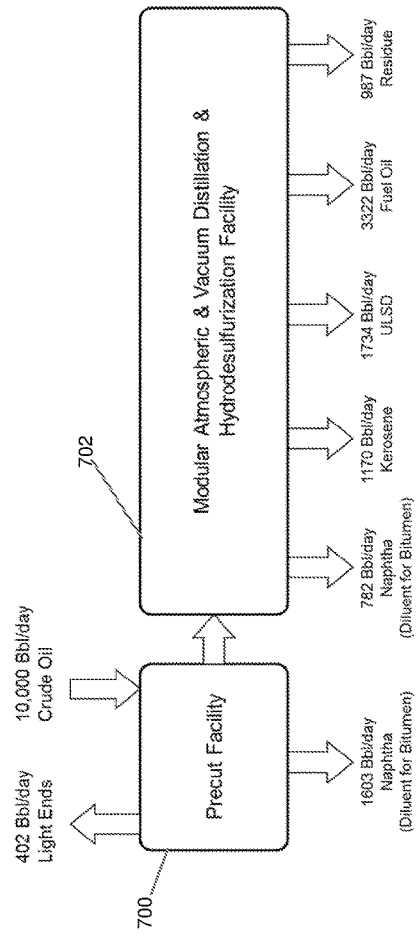
FIG. 7 is the modular processes designed for Crude Oil refining.

Bakken Tight Oil, that is, crude oil produced by fracture treatment of the Bakken shale formation ("Bakken Crude") is used here as an example to illustrate embodiments of a modular process for tight oil refining. Table 1 and FIGS. 6 and 7 show examples of quality differences between Bakken Crude and a typical light, conventionally produced crude oil (Crude Oil). In general, the Bakken Crude is lighter than Crude Oil, contains much less sulfur, has a much higher naphtha distillation yield, but has a much lower fuel oil distillation yield.

Desalted Bakken Crude moves first to the precut column heater at 600 in FIG. 6 where it is partially vaporized. The partially vaporized crude then enters the precut column with steam feeds into the bottom of the precut column 600 (and 700 in FIG. 7). The light ends (C1-C4) are stripped by the steam as a column vapor product, and a wide naphtha cut is removed by the steam as a column liquid distillate product. The distillate rate is manipulated to produce the wide naphtha cut with an ASTM D86 95% temperature of 375° F.

The precut column removes a significant portion of the light material (light ends and naphtha) from Bakken Crude. FIGS. 6 and 7 show that a total of 37.59 vol % light material from Bakken Crude and 20.05 volume % from Crude Oil are removed by the precut column. This reduces the load for the subsequent crude distillation unit (602 in FIGS. 6 and 702 in FIG. 7) and increases overall process capacity. Based on the same precut column crude feed capacity, Bakken Crude produces 12.10 volume % diesel vs. 17.34 volume % for the Crude Oil. While based on the same load for the subsequent crude distillation unit, the diesel production for Bakken Crude increases from 12.10 vol % to 15.50 vol %.

Figure 8:
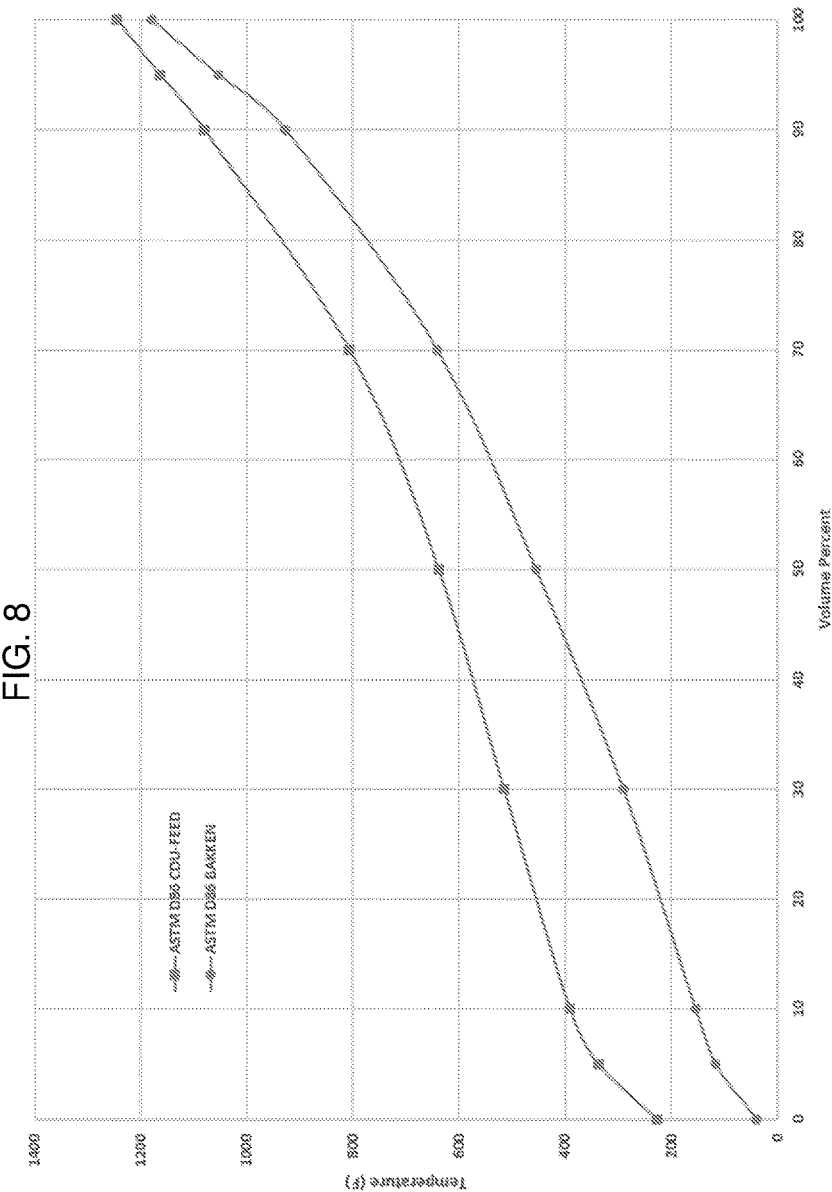
FIG. 8 is a comparison of ASTM D86 volume % curves for the Bakken Crude and the precut column bottom product.

FIG. 8 shows a graphic comparison of ASTM D86 volume % curves for the Bakken Crude and the precut column bottom product (CDU-FEED) which is the load for the subsequent crude distillation unit. Higher temperatures of the ASTM D86 volume % curve for the bottom product reflect the light material being removed by the precut column (Table 2).

TABLE 1

BAKKEN CRUDE VS. CRUDE OIL - KEY QUALITIES

| Property | Bakken Crude | Crude Oil |
|---|---|---|
| API Gravity @ 60/60° F. | 41.0 | 34.1 |
| Sulfur, wt % | 0.120 | 2.460 |
| Distillation Yield, volume % | | |
| Light Ends $C_1$-$C_4$ | 3.90 | 4.02 |
| Naphtha | 39.60 | 23.85 |
| Kerosene | 11.69 | 11.70 |
| Diesel | 12.10 | 17.34 |
| Fuel Oil | 22.92 | 33.22 |
| Vacuum Residue | 9.79 | 9.87 |
| TOTAL | 100.00 | 100.00 |
| D86 Curve, vol % | ° F. | |
| 0 | 38.7 | 5.2 |
| 5 | 117.3 | 145.8 |
| 10 | 155.1 | 226.8 |
| 30 | 291.1 | 407.9 |
| 50 | 455.1 | 559.1 |
| 70 | 641.4 | 741.8 |
| 90 | 927.9 | 1020.6 |
| 95 | 1053.1 | 1169.7 |
| 100 | 1178.4 | 1318.7 |
| TBP Curve, vol % | ° F. | |
| 0 | −35.6 | −98.7 |
| 5 | 35.8 | 82.9 |
| 10 | 127.7 | 196.1 |
| 30 | 277.5 | 402.9 |
| 50 | 457.1 | 567.0 |
| 70 | 668.7 | 772.2 |
| 90 | 1053.5 | 1143.5 |
| 95 | 1246.3 | 1331.4 |
| 100 | 1403.6 | 1565.6 |

TABLE 2

PRECUT COLUMN STREAM RESULTS VOL % CURVES

| STREAMS, VOL % | BAKKEN, ° F. | CDU-FEED, ° F. |
|---|---|---|
| 0 | 38.74 | 34.46 |
| 5 | 117.28 | 337.94 |
| 10 | 155.05 | 391.24 |
| 30 | 291.06 | 514.93 |
| 50 | 455.06 | 638.08 |
| 70 | 641.39 | 806.49 |
| 90 | 927.87 | 1079.88 |
| 95 | 1053.14 | 1162.51 |
| 100 | 1178.41 | 1245.15 |

Module H: Crude Distillation Unit with Gas Fired Heater

The precut column bottoms (CDU-FEED) may be further processed in an atmospheric crude distillation unit (CDU). The CDU consists of a gas fired heater which is similar to the precut column gas fired heater, and an atmospheric distillation column which has:

A total condenser
Three coupled side strippers
Two pumparound circuits
No bottom feed reboiler First, the CDU heater partially vaporizes the precut column bottoms, then the atmospheric distillation column separates the bottoms into five cuts:

Heavy naphtha (HNAPHTHA)
Kerosene
Diesel
Atmospheric gas oil (AGO)
Reduced crude (RED-CRD)

The heavy naphtha product flow is manipulated to achieve an ASTM D86 95% temperature of 375° F. and the diesel product flow rate is manipulated to achieve an ASTM D86 95% temperature of 640° F.

Module I: Hydrodesulfurization Unit Using a Reactive Distillation Column

Table 3 shows a comparison of tdiesel product properties for the diesel produced from Bakken Crude with respect to conventional Crude Oil (defined above). The sulfur content is much less in the Bakken diesel (0.129 weight %) due to the lower sulfur content in the original Bakken Crude (0.120 weight %).

When diesel containing sulfur compounds is used as a fuel, sulfur compounds will be exhausted into the atmosphere as $SO_x$ and the environment will be polluted. Thus, sulfur compounds should be removed from diesel products before they can be used as a fuel. The European Union has limited the sulfur content in diesel to 50 ppmw since 2005. In the United States, the EPA has limited the sulfur content in diesel to 500 ppmw since 1993 and for 2006, a 15 ppmw sulfur maximum is required for use in all model year 2007 and later highway diesel vehicles and engines. This diesel is referred to as ULSD. A sulfur limit of 15 ppmw became effective in June 2010 for non-road fuel, and in June 2012 for locomotive and marine fuels.

TABLE 3

BAKKEN DIESEL VS. CRUDE OIL DIESEL
BEFORE HYDRODESULFURIZATION

| Property | Bakken Diesel | Crude Oil Diesel |
|---|---|---|
| API Gravity | 34.5 | 33.4 |
| Sulfur, wt % | 0.129 | 2.223 |
| D86 Curve, vol % | ° F. | |
| 0 | 450.5 | 428.6 |
| 5 | 500.2 | 478.7 |
| 10 | 521.2 | 499.8 |
| 30 | 546.1 | 525.8 |
| 50 | 563.4 | 547.2 |
| 70 | 583.2 | 574.5 |
| 90 | 615.7 | 616.4 |
| 95 | 640.0 | 640.0 |
| 100 | 664.3 | 663.6 |
| TBP Curve, vol % | ° F. | |
| 0 | 391.2 | 365.8 |
| 5 | 471.9 | 448.2 |
| 10 | 497.6 | 472.8 |
| 30 | 542.3 | 519.0 |
| 50 | 571.6 | 554.3 |
| 70 | 601.7 | 593.9 |
| 90 | 643.9 | 646.1 |
| 95 | 662.3 | 667.0 |
| 100 | 697.0 | 697.5 |

Hydrodesulfurization (HDS) comprises reactions leading to the removal of sulfur compounds from diesel by their conversion into hydrocarbon products and hydrogen sulfide ($H_2S$). The sulfur compounds in diesel can be divided into four groups based on their reactivities which can be expressed by the pseudo-first-order rate constant (Table 4).

TABLE 4

REACTIVITIES OF SEVERAL SULFUR COMPOUNDS AT 300° C., 71 ATM, COMO/AL CATALYST

| Sulfur Compound | Structure | Formula | Pseudo-first-Order Rate Constant, $m^3$/kgcat sec |
|---|---|---|---|
| Thiophene (T) |  | $C_4H_4S$ | $1.38 \times 10^{-3}$ |
| Benzothiophene (BT) | 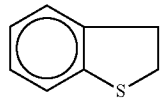 | $C_8H_6S$ | $8.11 \times 10^{-4}$ |
| Dibenzothiophene (DBT) | 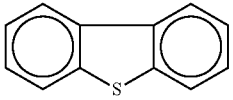 | $C_{12}H_8S$ | $6.11 \times 10^{-5}$ |
| 4,6-Dimethyl-dibenzothiphene (4,6-DMDBT) | 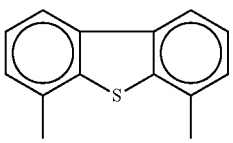 | $C_{14}H_{12}S$ | $4.92 \times 10^{-6}$ |

Group 1 comprises mainly of thiols and sulfides and is represented by thiophene (T) which has the highest reactivity among all sulfur compounds. A nearly complete HDS is achieved. Group 2 comprises BT, Benzonaphthothiophene (BNT) and 7,8,9,10-Tetrahydrobenzonaphthothiophene (7,8,9,10-THBNT) and is represented by BT which has the second high reactivity. A catalyst consisting essentially of cobalt-molybdnum supported on a porous alumina carrier CoMo/Al can be used for HDS of the above two groups of sulfur compounds. Group 3 comprises DBT,2,8-DMDBT, 3,7-DMDBT, 1,2,3-TMDBT and 2,3,7-TMDBT and is represented by DBT which only has moderate reactivity. A mixture of CoMo/Al and NiMo/Al catalysts is used for group 3 sulfur compounds to boost the HDS rate. Group 4 comprises 4-MDBT and 4,6-DMDBT and is represented by 4,6-DMDBT which has the lowest reactivity and a pure NiMo/Al catalyst and higher operation temperature and pressure are required.

The conventional HDS process for diesel sulfur removal uses a fixed-bed catalytic reactor with a countercurrent operation. In the fixed-bed reactor, a first layer of CoMo/Al catalyst, a second layer of CoMo/Al and NiMo/Al catalyst mixture and a third layer of NiMo/Al catalyst is used. After these catalysts in the reactor are presulfided, the sulfur containing diesel is passed over these catalysts to be desulfurized under conditions of 536-788° F. and 441 psia and a molar $H_2$/HC feed ratio of 2.4 to 2.8. Steady state simulations of the above fixed-bed reactor are performed by using Aspen Plus V7.3 (Table 5).

TABLE 5

HYDRODESULFURIZATION OF BAKKEN DIESEL USING FIXED-BED REACTOR

| Component | Sulfur, ppmw Before | Sulfur, ppmw After | Removal, % |
|---|---|---|---|
| $H_2S$ | 0 | 20.10 | 0 |
| Thiophene (T) | 430 | 0.00 | 100 |
| Benzothiophene (BT) | 430 | 3.31 | 99 |
| Dibenzothiophene (DBT) | 322 | 9.57 | 97 |
| 4,6-dimethyldibenzothiophene (4,6-DMDBT) | 107 | 14.85 | 86 |
| TOTAL | 1289 (0.129 wt %) | 47.83 | 96 |

The liquid phase composition of 20.10 ppmw for $H_2S$ in the HDS diesel product is the vapor-liquid equilibrium value of $H_2S$ generated by the HDS reactions. This $H_2S$ impurity in the diesel product can be removed from the diesel product by a stripping column. The remaining 27.73 ppmw sulfur content is still greater than the 15 ppmw sulfur maximum requirement set by the USEPA, so another fixed-bed reactor is needed after the stripping column.

It has been determined that the combination of two fixed-bed reactors and associated high and low pressure gas liquid separators plus the stripping column may be replaced by a single reactive distillation column. In the single reactive distillation column, HDS reaction products are continuously stripped out from the liquid phase, and the reactions are no longer equilibrium-restricted. The conversion rises substantially which enables the HDS process to operate at lower pressures such as the natural gas available pressure (e.g., at 365 psia) and a lower molar $H_2$/HC feed relation of 2.0 can be used. Steady state simulations of the reactive distillation column by using Aspen Plus V7.3 are shown in Table 6.

TABLE 6

HYDRODESULFURIZATION OF BAKKEN DIESEL USING REACTIVE DISTILLATION COLUMN

| Component | Sulfur, ppmw Before | Sulfur, ppmw After | Removal, % |
|---|---|---|---|
| $H_2S$ | 0 | 0.00 | 0 |
| Thiophene (T) | 430 | 0.00 | 100 |
| Benzothiophene (BT) | 430 | 2.21 | 99 |
| Dibenzothiophene (DBT) | 322 | 5.06 | 98 |
| 4,6-dimethyldibenzothiophene (4,6-DMDBT) | 107 | 6.78 | 94 |
| TOTAL | 1289 (0.129 wt %) | 14.05 | 99 |

Module J: Vacuum Distillation Column

The residue from the Crude Distillation Column may be further processed in a Vacuum Distillation Column to complete the Modular Process for Tight Oil Refining. The Vacuum Distillation Column separates the residue from Crude Distillation Unit into:
- Off-Gas
- Light Vacuum Gas Oil (LVGO)
- Heavy Vacuum Gas Oil (HVGO)
- Asphaltic Residue (Residue)

This Vacuum Distillation Column has no condenser or reboiler. Stripping steam is fed into the bottom of the column. The column furnace operates at a pressure of 2.03 psia, and provides an overflash of 0.6%. The overflash is bypassed to the column furnace. The column also has two pumparound circuits to provide the heat required for the column.

EXAMPLE 1

10,000 bbl/day of desalted Bakken crude is directed to a precut column heater which is operated at 450° F. and 50 psia. The crude is partially vaporized before it enters the bottom of the column where 500 lb/hr of steam at 400° F. and 60 psia is fed. The precut column has 10 theoretical stages and a partial-vapor-liquid condenser but no reboiler.

The distillate rate may be adjusted to produce a wide naphtha cut with an ASTM D86 95% temperature of 375° F. A final value of 3773.4 bbl/day is obtained for the distillate rate which subtracts the vapor flow (401.6 bbl/day) and water content (3.3 bbl/day) to yield a naphtha product of 3368.5 bbl/day. The light ends ($C_3$-$C_4$) are stripped by the steam as a column vapor product which accounts for 390 bbl/day. Thus a total of 3759 bbl/day light material is removed by the precut column which reduces the load for the subsequent crude distillation unit and increases the overall process capacity. Table 7 presents a summary of simulation results for the precut column top stage and bottom stage, and the precut column simulation summary (temperature, pressure, flow and heat duty) is presented in Table 8.

TABLE 7

TOP STAGE AND BOTTOM STAGE PERFORMANCES

Top Stage Performance

| | | |
|---|---|---|
| Temperature | 170.00 | F. |
| Pressure | 38.7 | Psia |
| Heat Duty | −11.55 | MMBtu/hr |
| Subcooled Duty | — | — |
| Distillate Rate | 3773.41 | Bbl/day |
| Reflux Rate | 1366.62 | Bbl/day |
| Reflux Ratio | 0.36 | |
| Free Water Distillate Rate | 17.36 | Bbl/day |
| Free Water Reflux Ratio | 0 | |

Bottom Stage Performance

| | | |
|---|---|---|
| Temperature | 440.00 | F. |
| Pressure | 44.7 | Psia |
| Heat Duty | 0 | MMBtu/hr |
| Bottoms Rate | 6243.53 | Bbl/day |
| Boilup Rate | 444.14 | Bbl/day |
| Boilup Ratio | 0.07 | Bbl/day |

TABLE 8

PRECUT COLUMN TEMPERATURE, PRESSURE, FLOW AND HEAT DUTY SUMMARY

| Stage | Temp., ° F. | Pressure, psia | Heat Duty, MMBtu | Liquid Flow, bbl/day | Vapor Flow, bbl/day |
|---|---|---|---|---|---|
| 1 | 170.00 | 39.70 | −11.55 | 4738.40 | 401.63 |
| 2 | 338.98 | 41.70 | 0.00 | 1505.55 | 5157.38 |
| 3 | 379.02 | 42.08 | 0.00 | 1497.31 | 5296.32 |
| 4 | 392.53 | 42.45 | 0.00 | 1443.57 | 5288.07 |
| 5 | 399.15 | 42.83 | 0.00 | 1383.40 | 5234.34 |
| 6 | 403.66 | 43.20 | 0.00 | 1316.12 | 5174.17 |
| 7 | 407.74 | 43.58 | 0.00 | 1226.81 | 5106.89 |
| 8 | 412.52 | 43.95 | 0.00 | 1069.30 | 5017.58 |
| 9 | 420.29 | 44.33 | 0.00 | 497.02 | 4860.07 |
| 10 | 440.00 | 44.70 | 0.00 | 6243.53 | 444.14 |

EXAMPLE 2

The precut column bottoms are further processed in an atmospheric crude distillation unit to separate the bottoms into five cuts:

Heavy naphtha (HNAPHTHA)
Kerosene
Diesel
Atmospheric gas oil (AGO)
Reduced crude (RED-CRD)

The heavy naphtha product flow may be controlled to obtain an ASTM D86 95% temperature of 375° F. and the diesel product flow rate may be adjusted to obtain an ASTM D86 95% temperature of 640° F.

The CDU consists of a gas fired heater which is similar to the precut column gas fired heater, and an atmospheric column which has:

A total condenser
Three coupled side strippers
Two pumparound circuits
No bottom feed reboiler The CDU in the present example embodiment has 25 equilibrium stages. The column heater operates at a pressure of 24.18 psia and provides an overflash of 3% in the column. The heater outlet enters the CDU at stage 22. The column condenser operates at 15.7 psia with a pressure drop of 5 psi. The column pressure drop is 4 psi. The CDU has two pumparounds. The following table shows their locations and specifications.

TABLE 9

SUMMARY OF THE TWO PUMPAROUNDS

| Pumparound | Location | Specification |
|---|---|---|
| 1 | From stage 8 to 6 | Flow: 4900 bbl/day<br>Duty: −4 MMBTU/hr |
| 2 | From stage 14 to 13 | Flow: 1100 bbl/day<br>Duty: −1.5 MMBTU/hr |

The CDU also has three side strippers. Their locations and operating specifications are:

TABLE 10

SUMMARY OF THREE SIDE STRIPPERS

| Stripper | Location | Specifications |
|---|---|---|
| Kerosene | Liquid draw from stage 6<br>Vapor return to 5 | Product rate: 1170 bbl/day<br>Steam stripping (CU-STM1)<br>4 equilibrium stages |
| Diesel | Liquid draw from stage 13<br>Vapor return to 12 | Product rate: 1650 bbl/day<br>(estimate)<br>Steam stripping (CU-STM2)<br>3 equilibrium stages |
| AGO | Liquid draw from stage 18<br>Vapor return to 17 | Product rate: 850 bbl/day<br>Steam stripping (CU-STM3)<br>2 equilibrium stages |

The diesel flow rate is an estimate only and may be adjusted to obtain an ASTM 95% temperature of 640° F. for the diesel product. The final value for diesel flow rate is 1210 bbl/day, and the final heavy naphtha flow rate is 591 bbl/day. All side strippers and the main column may use steam for stripping. The following table summarizes the applicable steam flows and conditions:

TABLE 11

SUMMARY OF STEAM FLOWS

| Stream | Location | Conditions and Flow |
|---|---|---|
| CU-STEAM | Main column | 400° F., 60 psi, 1200 lb/hr |
| CU-STM1 | Kerosene stripper | 400° F., 60 psi, 330 lb/hr |
| CU-STM2 | Diesel stripper | 400° F., 60 psi, 100 lb/hr |
| CU-STM3 | AGO stripper | 400° F., 60 psi, 80 lb/hr |

Figure 9:
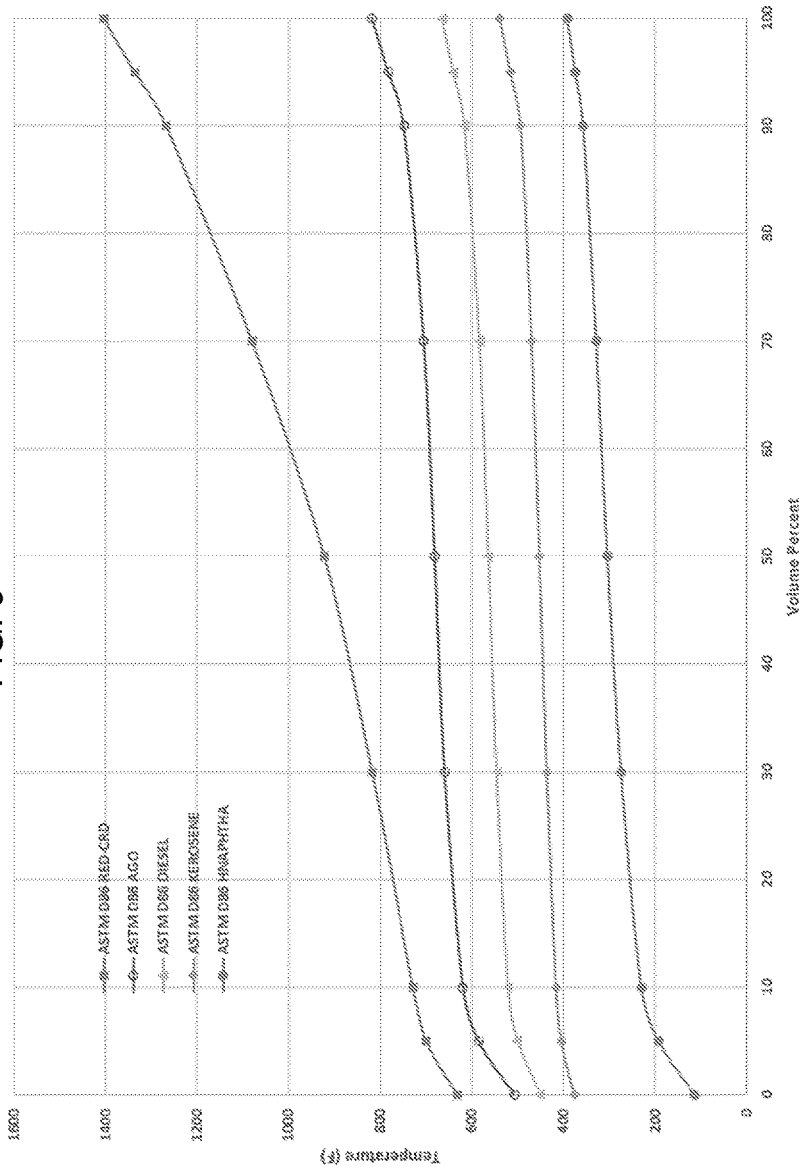
FIG. 9 is atmospheric crude distillation unit stream result volume % curves.

The CDU column summary (Temperature, Pressure, Flow and Heat Duty) is presented in Table 12, and the stream results are presented in Table 13 and graphically in FIG. 9.

TABLE 12

TEMPERATURE, PRESSURE, FLOW AND HEAT DUTY

| Stage | Temp., ° F. | Pressure, psia | Heat Duty, MMBtu | Liquid Flow, bbl/day | Vapor Flow, bbl/day |
|---|---|---|---|---|---|
| 1 | 178.15 | 15.70 | −7.94 | 2760.73 | 0.00 |
| 2 | 315.95 | 20.70 | 0.00 | 2936.02 | 2878.42 |
| 3 | 357.28 | 20.87 | 0.00 | 3159.49 | 3645.22 |
| 4 | 380.34 | 21.05 | 0.00 | 3175.34 | 3868.70 |
| 5 | 400.49 | 21.22 | 0.00 | 3102.92 | 3884.55 |
| 6 | 424.02 | 21.40 | −4.00 | 10056.07 | 3434.33 |
| 7 | 443.34 | 21.57 | 0.00 | 9042.73 | 5487.49 |
| 8 | 459.01 | 21.74 | 0.00 | 9183.26 | 5999.30 |
| 9 | 480.61 | 21.92 | 0.00 | 4279.74 | 6139.83 |
| 10 | 497.32 | 22.09 | 0.00 | 4223.33 | 6136.31 |
| 11 | 511.81 | 22.27 | 0.00 | 4099.68 | 6079.90 |
| 12 | 526.48 | 22.44 | 0.00 | 3892.94 | 5956.25 |
| 13 | 543.85 | 22.61 | −1.50 | 5662.46 | 5535.38 |
| 14 | 567.21 | 22.79 | 0.00 | 4115.56 | 6204.90 |
| 15 | 588.14 | 22.96 | 0.00 | 2836.15 | 6075.62 |
| 16 | 604.16 | 23.13 | 0.00 | 2637.59 | 5896.21 |
| 17 | 617.78 | 23.31 | 0.00 | 2358.68 | 5697.65 |
| 18 | 632.31 | 23.48 | 0.00 | 1945.90 | 5290.41 |
| 19 | 651.48 | 23.66 | 0.00 | 697.36 | 4877.64 |
| 20 | 663.92 | 23.83 | 0.00 | 498.73 | 4601.94 |
| 21 | 672.17 | 24.00 | 0.00 | 187.31 | 4403.31 |
| 22 | 675.43 | 24.18 | 0.00 | 2800.18 | 767.28 |
| 23 | 670.99 | 24.35 | 0.00 | 2684.02 | 461.22 |
| 24 | 666.23 | 24.53 | 0.00 | 2582.52 | 345.06 |
| 25 | 653.41 | 24.70 | 0.00 | 2421.28 | 243.57 |

TABLE 13

ATMOSPHERIC CRUDE DISTILLATION UNIT STREAM RESULTS VOL % CURVES

| Streams, Vol % | RED-CRD, ° F. | HNAPHTHA, ° F. | Kerosene, ° F. | Diesel, ° F. | AGO, ° F. |
|---|---|---|---|---|---|
| 0 | 631.26 | 113.33 | 376.85 | 450.49 | 507.12 |
| 5 | 699.25 | 192.96 | 404.93 | 500.24 | 584.97 |
| 10 | 728.11 | 230.36 | 416.40 | 521.15 | 618.84 |
| 30 | 817.99 | 274.94 | 436.48 | 546.05 | 659.04 |
| 50 | 922.41 | 304.82 | 452.26 | 563.37 | 680.44 |
| 70 | 1080.08 | 329.13 | 469.49 | 583.25 | 704.35 |
| 90 | 1267.67 | 357.63 | 493.79 | 615.66 | 748.42 |
| 95 | 1336.38 | 375.00 | 516.42 | 640.00 | 783.57 |
| 100 | 1405.08 | 392.37 | 539.04 | 664.34 | 818.73 |

EXAMPLE 3

The reduced crude from the CDU is further treated in a vacuum distillation column to separate it into:
Off-gas
Light vacuum gas oil (LVGO)
Heavy vacuum gas oil (HVGO)
Asphaltic residue (Residue)

The vacuum column in the present example embodiment may have six equilibrium stages but no condenser or reboiler. 1800 lb/hr of stripping steam is fed to the bottom of the vacuum column at 400° F. and 60 psia. The column heater operates at a pressure of 2.03 pia, and provides an overflash of 0.6%. The vacuum column has two pump-around circuits. The following table shows their locations and specifications.

TABLE 14

SUMMARY OF PUMPAROUNDS

| Pumparound | Location | Specification |
|---|---|---|
| 1 | From stage 2 to 1 | Flow: 1600 bbl/day<br>Duty: −1.56 MMBTU/hr |
| 2 | From stage 4 to 3 | Flow: 3920 bbl/day<br>Duty: −5.54 MMBTU/hr |

The duty for the first pumparound is adjusted so that the top of the column is at 150° F. The second pumparound provides all the necessary reflux for the lower section of the column.

Table 15 summarizes the vacuum distillation column temperature, pressure, flow and heat duty:

TABLE 15

VACUUM DISTILLATION COLUMN SUMMARY

| Stage | Temp., ° F. | Pressure, psia | Heat Duty, MMBtu | Liquid Flow, bbl/day | Vapor Flow, bbl/day |
|---|---|---|---|---|---|
| 1 | 150.00 | 1.16 | −0.44 | 1601.03 | 123.77 |
| 2 | 190.49 | 1.20 | 0.00 | 1679.23 | 124.80 |
| 3 | 407.21 | 1.24 | −5.54 | 4591.04 | 203.00 |
| 4 | 523.66 | 1.28 | 0.00 | 5709.26 | 874.04 |
| 5 | 706.49 | 1.31 | 0.00 | 89.88 | 1992.25 |
| 6 | 746.57 | 1.35 | 0.00 | 978.77 | 561.18 |

Figure 10:
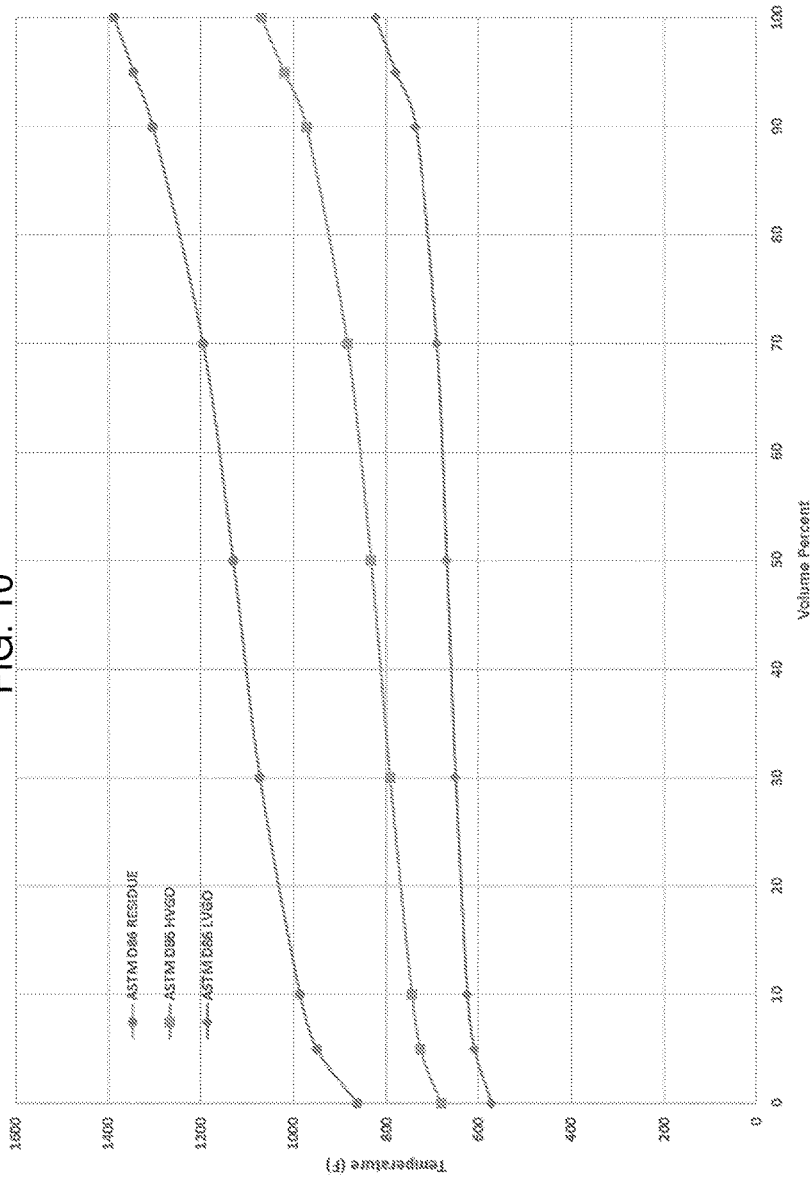
FIG. 10 is the ASTM D86 volume % curves for HVGO, LVGO and Residue.

Table 16 and FIG. 10 show the ASTM D86 volume % curves for HVGO, LVGO and Residue.

TABLE 16

ASTM D86 VOLUME % CURVES FOR HVGO, LVGO AND ASPHALTIC RESIDUE

| Streams, Vol % | Residue, ° F. | LVGO, ° F. | HVGO, ° F. |
|---|---|---|---|
| 0 | 863.42 | 572.69 | 680.36 |
| 5 | 949.23 | 609.40 | 725.59 |
| 10 | 985.78 | 624.44 | 744.22 |
| 30 | 1072.56 | 649.82 | 791.44 |
| 50 | 1130.32 | 668.78 | 832.60 |
| 70 | 1195.52 | 690.77 | 883.81 |
| 90 | 1303.80 | 736.80 | 971.83 |
| 95 | 1346.13 | 780.38 | 1020.24 |
| 100 | 1388.45 | 823.96 | 1068.65 |

EXAMPLE 4

The Bakken diesel produced from Example 2 contains 0.129 wt % sulfur which must be removed down to 15 ppmw or below before it can be used as a diesel fuel (per U.S. EPA Regulations). As discussed above, a reactive distillation column with the specifications as stated in Table 17 along with proper H2 feed and HDS catalysts are employed to handle sulfur properly.

TABLE 17

REACTIVE DISTILLATION COLUMN CONFIGURATIONS

| | |
|---|---|
| No. of Stages | 19 |
| Reactive Stages | 5-6, 7-9, 10-12, 13-15 |
| Non-Reactive Stages | 1-4, 16-19 |
| Diesel Feed Stage | Above Stage 7 |
| H2 Feed Stages | Above Stage 10, Above Stage 16 |
| Molar Reflux Ratio | 0.5 |
| Temperature Profile, ° C. (° F.) | |
| Reactive Zone I | 375-392 (706-738) |
| Reaction Zone II | 413-485 (775-905) |
| Reaction Zone III | 528-565 (982-1049) |
| Reaction Zone IV | 578-602 (1072-1115) |
| Catalyst Loading | |
| Reactive Zone I | CoMo/Al |
| Reaction Zone II | CoMo/Al |
| Reaction Zone III | CoMo/Al & NiMo/Al |
| Reaction Zone IV | NiMo/Al |

The HDS results had been presented in Table 6. When the Bakken crude contains more sulfur than 0.120 weight %, additional sulfur compounds should be identified by group and then the number of column stages in the corresponding reactive zones may be adjusted in order to obtain a sulfur level of 15 ppmw or less.

EXAMPLE 5

Figure 11:
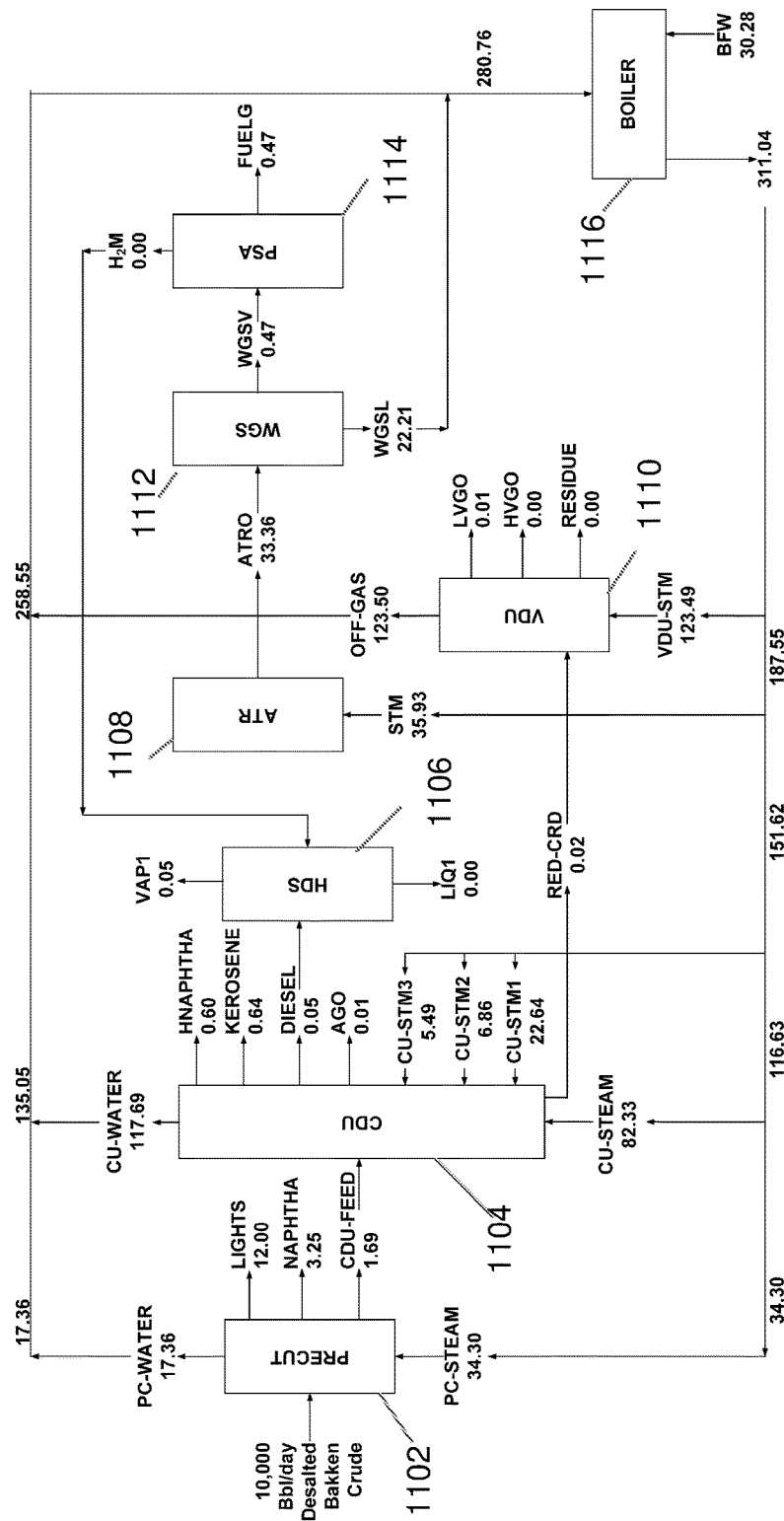
FIG. 11 shows a system for providing overall water balance for the production of ULSD from 10,000 bbl/day of desalted crude oil from the Bakken shale formation.

FIG. 11 schematically shows an overall water balance for the entire system implementing a process according to the present disclosure. Numbers indicating input and output to the various components of the system represent water and other product volumes entering and exiting each of the described system units. The process starts by feeding 10,000 bbl/day of desalted Bakken Crude into the precut column 1102. Production of ultra low sulfur diesel (ULSD) from the reactive distillation column is one product output. Only 30.28 bbl/day of make-up BFW are needed to enter a boiler 1116 to process 10,000 bbl/day of desalted Bakken Crude. CDU feed from the precut column 1102 is conducted to a crude distillation unit 1104. Diesel fuel output from the crude distillation unit 1104 is conducted to a hydrodesulfuization unit (HDS) 1106. Partially refined crude oil may be conducted from the HDU 1106 to a vacuum distillation unit (VDU) 1110. Gas from the VDU 1110 may be input to the boiler 1116. Output of the HDS 1106 may in part include liquid. Steam from the boiler 1116 may be conducted to the CDU 1104, to the precut column 1102, to the VDU 1110 and to the autothermal reformer (ATR) 1108. Output of the ATR 1108 may be conducted to a water gas separator (WGS) 1112. Output of the WGS 1112 may be conducted to a pressure swing adsorption unit (PSA) 1114. Output from the PSA 1114 may be fuel gas. The process shown in FIG. 11 further demonstrates that processes and apparatus according to the present disclosure can automatically optimize the water usage at the same time.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f), for any limitations of any of the claims herein, except for those in which the claim expressly uses the words "means for" together with an associated function.

What is claimed is:

1. A modular process for tight oil refining comprising:
   (A) producing purified salt;
   (B) producing hydrochloric acid (HCl) using the purified salt and produced hydrogen;
   (C) producing hydrogen using an autothermal reformer;
   (D) hydraulic fracturing a subsurface formation using the produced HCl and producing crude oil from the fractured formation;
   (E) desalting the crude oil using a bi-electric configuration with an interchanger;
   (F) recovering and recycling water used in the desalting;
   (G) generating a precut column using a heater for distilling the desalted crude oil;
   (H) distilling a precut column product using a heater;
   (I) hydrodesulfurizing, using the produced hydrogen, the distilled precut column product using a reactive distillation column; and
   (J) vacuum distilling residue fron the distilling the precut column.

2. The process as set forth in claim 1, wherein a facility for performing the purified salt production is optimally sized to produce 131 STPD and to serve three satellite chloralkali plants with each chloralkali plant producing 68 STPD of 35.7% HCl as well as 53 STPD of 50 wt % NaOH.

3. The process as set forth in claim 1, wherein 10-15% excess hydrogen is produced by the HCl production to reduce truck transportation requirements for sodium hypochlorite products.

4. The process as set forth in claim 1, wherein 10-15% excess hydrogen is produced by the HCl production by an autothermal reformer using coproduced tight gas, 93 volume percent oxygen and low pressure steam as feedstock.

5. The process as set forth in claim 1, wherein effluent from the desalteing is directed to flow through a coalescer and filter unit which will coalesce oil droplets and filter the oil droplets out, the method further comprising adding Make-up water to a total water stream directed through an ultra filtration unit to eliminate residual solids and colloids and flowing a resultant permeate stream through a reverse osmosis unit wherein salts are discharged and clean water is cycled into the desalteing.

6. The process as set forth in claim 1, wherein the precut column optimizes steam flow plus a column heater temperature while minimizing a total number of theoretical stages such that 85% of naphtha is stripped by the steam without losing kerosene in light ends.

7. The process as set forth in claim 1, wherein the speed of a combustion air blower in the precut column preheater can be adjusted such that the air is forced tangentially into an inner cone with rotational flow that generates vortexes at primary and secondary combustion zones creating flames which minimize radiant heat.

8. The process as set forth in claim 1, wherein a precut column naphtha product flow rate is adjusted to achieve an ASTM D86 95% temperature of 375° F.

9. The process as set forth in claim 1, wherein a crude distillation naphtha product flow rate is adjusted to achieve an ASTM D86 95% temperature of 375° F. and diesel product flow rate is adjusted to achieve an ASTM D86 95% temperature of 640° F.

10. The process as set forth in claim 1, wherein sulfur compounds in diesel are divided into four groups based on a pseudo-first-order rate constant, the groups comprising:
Group 1 comprises thiols and sulfides and is represented by thiophene (T) with a rate constant of $1.38 \times 10^{-3}$;
Group 2 comprises benzothiophene (BT), BNT and 7,8,9,10-THBNT and is represented by BT with a rate constant of $8.11 \times 10^{-4}$;
Group 3 comprises DBT, 2,8-DMDBT, 3,7-DMDBT, 1,2,3-TMDBT and 2,3,7-TMDBT is represented by DBT with a rate constant of $6.11 \times 10^{-5}$; and
Group 4 comprises 4-MDBT and 4,6-DMDBT and is represented by 4,6-DMDBT with a rate constant of $4.92 \times 10^{-6}$.

11. The process as set forth in claim 10, wherein corresponding to each sulfur compound group there is a reactive zone in the reactive distillation having a corresponding specified temperature range in ° C. (° F.); the reactive zones comprising:
Reactive Zone I 375-392 (706-738);
Reactive Zone II 413-485 (775-905);
Reactive Zone III 528-565 (982-1049); and
Reactive Zone IV 578-602 (1072-1115).

12. The process as set forth in claim 10, wherein a catalyst packing arrangement in the reactive distillation comprises four reactive zones, comprising:
Reactive Zone I CoMo/Al;
Reactive Zone II CoMo/Al;
Reactive Zone III CoMo/Al & NiMo/Al; and
Reactive Zone IV NiMo/Al.

13. The process as set forth in claim 10, wherein reactive distillation is used for hydrodesulfurization (HDS), HDS reaction products continuously stripped out from a liquid phase, and HDS reactions are thereby not equilibrium-restricted, whereby conversions rise so as to enable the HDS to operate at a natural gas feed pressure.

14. The process as set forth in claim 13, wherein a product of the reactive distillation is fed with one half of the hydrogen feed under reactive zone II, and the other half thereof is fed under reactive zone IV, resulting in the optimum conversions for sulfur compounds.

15. The process as set forth in claim 13, wherein molar H2/HC feed relation of 2.0 is used for the reactive distillation.

16. The process as set forth in claim 1, wherein only 30.28 barrels per day of make up BFW are needed to process 10,000 barrels per day of desalted crude oil.

17. The process as set forth in claim 1, wherein a compact autothermal reformer utilizes a noble metal monolith catalyst that enables space velocities sufficient to enable having a small highly functional unit for hydrogen production.

18. The process as set forth in claim 1, wherein hydrodesulfurization catalysts used for production of Ultra Low Sulfur Diesel and to minimize and optimize consumption of hydrogen.

19. The process as set forth in claim 1, wherein 2,000 to 20,000 barrels per day of crude oil are processed in modular plants for decentralized operations.

20. The process as set forth in claim 1, wherein a local crude oil blend feedstock and produced Ultra Low Sulfur Diesel are used for local consumption.

\* \* \* \* \*